Figure 1:
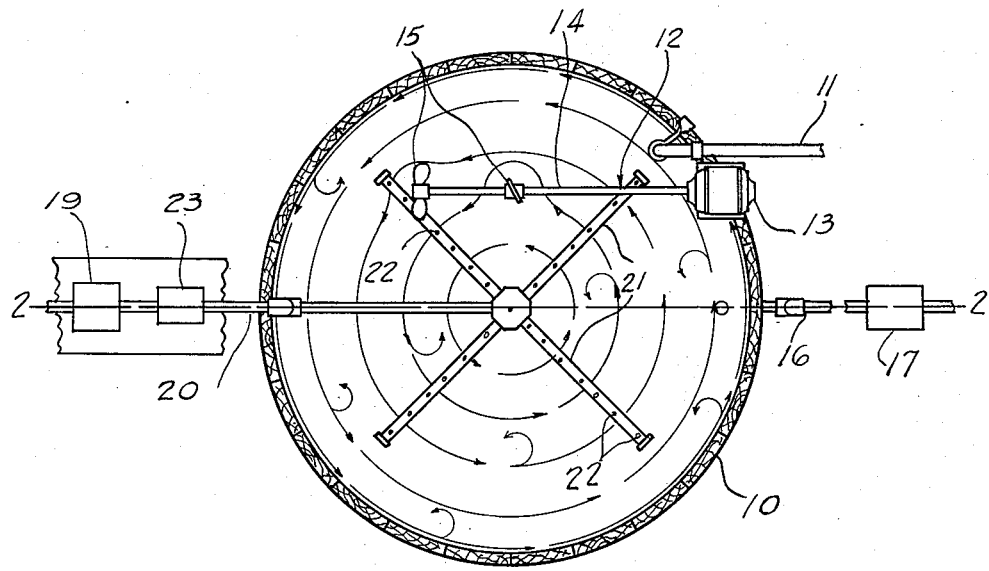

April 1, 1941.   N. C. FISCHER   2,236,773
TREATMENT OF EGG WHITES
Filed Oct. 18, 1939

INVENTOR
Norman C. Fischer
BY Carl C. Batz
ATTORNEY

UNITED STATES PATENT OFFICE 2,236,773

TREATMENT OF EGG WHITES

Norman C. Fischer, Springfield, Mo., assignor to Armour and Company, Chicago, Ill., a corporation of Illinois Application October 18, 1939, Serial No. 299,932

9 Claims. (Cl. 99—210)

This invention relates to the production of dried egg whites and deals particularly with the treatment of egg whites prior to drying in order to improve the quality of the dried product This application may be considered a continuation in part of my copending application Serial 287,622, filed July 31, 1939. In that application I describe a process wherein the egg whites are subjected to bacterial action or fermentation and which yields a dried product of good color and odor having satisfactory whipping and aging qualities.

In any of the prior processes for treating egg whites for drying wherein the whites are fermented, there has always been difficulty and objection because of an off odor and taste. These objections have proved a great drawback in the dried egg industry, and any process for overcoming them without imparting other difficulties is of great commercial importance.

I have discovered that the odor and taste characteristics of the dried product can be improved by circulating the egg white mass within itself while fermentation is taking place, and have further discovered that by passing air or other oxygen-containing gas through the egg white mass a dried product of higher quality can be obtained.

Apparently in the previous treatment of eggs by fermentation, air or oxygen has been present in such small quantities as to favor anaerobic bacteria. No doubt a factor contributing to this result has been the use of large vats holding thousands of pounds of egg whites. In the old methods of fermentation the egg white mass was allowed to remain at rest during the fermentation period, and especially in the lower portion of the vat the oxygen tension must have been very low in the course of fermentation. It is my belief that in the old processes the activity of anaerobic bacteria contributed in a large part to the objectionable odor and taste characteristics in the dried egg product. By the present invention, conditions are made unfavorable to the activity of the anaerobic bacteria and favorable to the aerobic bacteria, the aerobic bacteria having a desirable action in the fermentation process. By constant agitation of the mass during the fermenting period no part of the material is left out of access to a supply of oxygen and this operates to relieve the lack of oxygen at localized portions of the mass particularly in the lower portion of the vat. By bubbling oxygen-containing gas through the egg white mass during fermentation I directly supply oxygen to the egg mass. It is also true that the circulation of the mass during the introduction of the gas aids in distributing the introduced gas and provides a uniform condition unfavorable to anaerobic bacteria.

Figure 2:
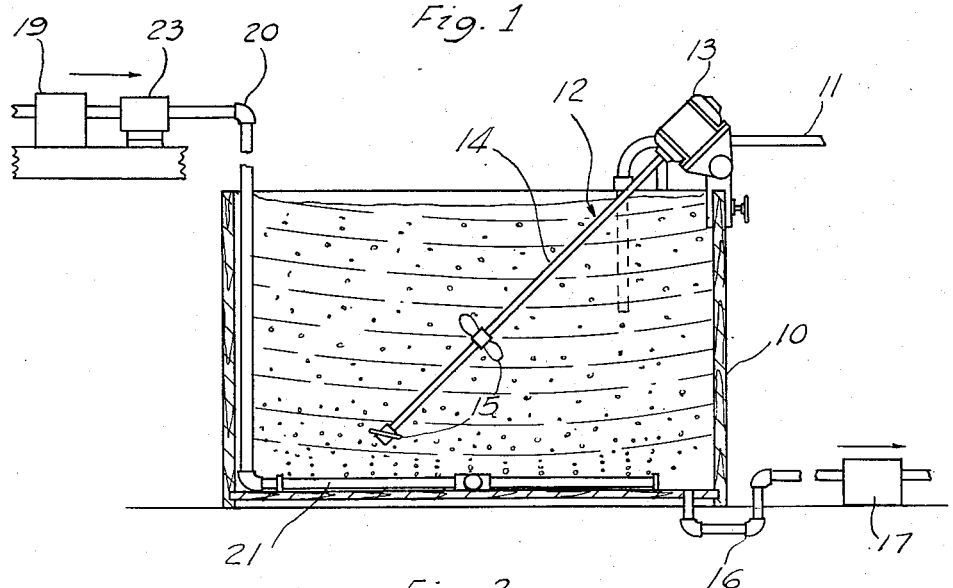

The invention and its benefits will be more clearly understood after the following detailed description of one mode of practice, taken with the accompanying drawing in which:

Figure 1 is a plan view of equipment suitable for carrying out the improved process, and Figure 2 is a vertical sectional view taken as indicated at line 2—2 of Figure 1.

As an example of carrying out the improved process, a large vat 10 may be filled with 15,000 pounds of fresh egg whites. To this is added 102 pounds of hydrochloric acid of 37.0% to 38.5% concentration diluted with 4 to 5 parts of water. This acid may be added as through tube 11, the egg whites being stirred with a stirrer 12 mounted on the side of vat 10. The stirrer 12 may comprise a motor 13 having an extended shaft 14 provided with the propellers 15. As the acid is added through tube 11 the stirrer 12 operates to circulate the egg white material within the vat in a whirling fashion, as indicated by arrows in Figure 1, so as to distribute the acid throughout the entire mass and prevent local action at any particular portion. The acid may be added over a period of about 20 minutes and the agitation by the stirrer 12 then continued. The fresh egg whites are quite viscous and it will be found that in the initial stages of hydrolysis by acid, the material becomes even more viscous, reaching a maximum viscosity in about 15 minutes after the acid has been added. Thereafter the viscosity of the material decreases and after about one hour the hydrolysis will be substantially complete and the viscosity of the mass will be substantially that of water.

Soon after the addition of the acid, a scum will begin to form on top of the mass, and this scum consists probably of certain kinds of insolubles such as chalaza and stringy portions of the egg white, together with a certain amount of foam. It is desirable to keep the foam down to a minimum, and for this reason the continued agitation should not beat the surface of the mass or produce too much surface agitation. It will be noted that in the illustration given the operation of the propellers 15 is to direct the material downwardly within the vat as well as to give it a whirling motion. This serves to circulate the mass from top to bottom as well as about the sides. After a certain period of agitation the scum and foam which had formed on top of the mass begins to disappear, and in about six or eight hours practically all of the scum and foam will have been dispersed throughout the mass.

The stirrer 12 is preferably kept in continuous operation throughout the fermentation period, and several benefits are obtained through its operation. One of the benefits is in keeping the insolubles in suspension throughout the mass and preventing settling; another benefit is in mixing the various portions of the material within the vat to prevent localized conditions particularly in the bottom of the vat which would be preferentially favorable to anaerobic bacteria; and still a further benefit is in bringing the oxygen of the introduced gas into solution within the egg white mass to provide a uniform condition unfavorable to anaerobic bacteria and preferential to the aerobic type of bacteria. The stirring is preferably carried on continuously during the fermentation period, but if the stirring should be intermittent, it should be at sufficient intervals to maintain the substantially uniform anaerobic condition throughout the mass.

The length of time necessary for the fermentation to take place may vary considerably, depending somewhat on the temperature of the egg material. For a normal room temperature of about 72° F. I prefer to allow about 96 hours for fermentation to take place but longer or shorter periods can be used to advantage. Generally the length of the period required will be between 60 and 120 hours. My invention contemplates any length of period which under the temperature conditions employed would produce fermentation independently of acid treatment sufficient to enable whipping of the reconstituted product, and in the appended claims the terms "fermenting" and "fermentation" should be so understood. I have found that a fermentation period of 40 hours at 74° F. will not yield, when used in the specific example given, a desirable amount of bacterial action, and in general lower temperatures require longer fermentation periods while higher temperatures require shorter periods.

During the period of fermentation an oxygen-containing gas is pumped by means of the pump 19 through the line 20 and filter 23 into the gas distributor 21 from which it emerges through the openings 22 and passes upwardly in the form of small bubbles to the surface of the egg white mass. The oxygen-containing gas may be simply air, may be pure oxygen, or other non-toxic gas containing oxygen. The gas distributor 21 rests at the bottom of the vat and has diverging channels extending outwardly toward the vat circumference, and each of the channels have the upwardly extending openings 22 through which the gas may escape into the egg white material. It is contemplated that any other suitable means for discharging the gas into the bottom of the vat may be employed.

After fermentation the egg material is dried preferably in a spray drier. Referring again to the illustration the fermented egg material in the vat 10 is discharged through the line 16 and is forced by the pump 17 to the spray drying equipment not shown. If desired, an alkali can be added to the fermented egg whites to bring the pH nearer neutrality before drying and this provides a product which may be better for some purposes.

Though in the foregoing example hydrochloric acid is used, other acids such as lactic or citric may be employed, and preferably sufficient acid should be added to reduce the pH of the material to about 5 or 5.2, though lesser amounts of acid may be used to advantage. However, the invention may be practiced without the addition of any acid, the benefits of a condition preferential to aerobic bacterial action being realized whenever the egg white material is fermented in a mass. I find it preferable to use the acid in connection with the passing of air through the material since the acid also helps to create a condition less favorable to anaerobic bacteria.

Though benefits would result from merely discharging the oxygen-containing gas in the lower central portion of the vat, I find it better to introduce the gas through a great number of small openings distributed over the bottom area of the vat, and find it particularly beneficial that the material is kept in motion as the gas is introduced by a stationary jet or opening since this helps greatly in making the oxygen tension more uniform throughout the mass.

Though I have mentioned specific ways of carrying out the various steps of the process, it will be understood that other specific ways may be employed, and various changes and modifications may be made in the practice of the process without departing from the spirit of the invention. The foregoing detailed description and example has been given for purposes of explanation only, and no unnecessary limitations should be understood therefrom.

I claim:

1. In the treatment of egg whites for drying wherein the whites are subjected to fermentation, the step of passing an oxygen-containing gas through said whites during fermentation to provide a condition less favorable to anaerobic bacteria.

2. In the treatment of egg whites for drying wherein the whites are subjected to fermentation, the step of passing an oxygen-containing gas through said whites during fermentation while mechanically agitating the whites to provide a substantially uniform condition throughout said whites which is unfavorable to anaerobic bacteria.

3. In the treatment of egg whites for drying, the steps of fermenting a mass of egg whites, and while fermentation is taking place bubbling air upwardly through said mass to provide a condition less favorable to anaerobic bacteria.

4. The process of treating egg whites comprising adding acid to the egg whites, ferementing the acidified egg white material, during fermentation passing an oxygen-containing gas through the acidified egg whites, and drying the fermented material.

5. The process of treating egg whites comprising adding acid to the egg whites, fermenting the acidified egg whites, during fermentation passing an oxygen-containing gas through the acidified egg whites, circulating the egg white mass while passing said gas therethrough, and drying the fermented egg white material.

6. In the treatment of egg whites for drying wherein the whites are subjected to fermentation in a vat, the step of introducing an oxygen-containing gas through a plurality of spaced openings in the bottom portion of said vat, said introduced gas being permitted to bubble upwardly through the egg white mass during fermentation.

7. In the treatment of egg whites for drying wherein the whites are subjected to fermentation, the steps of introducing oxygen-containing gas into the egg white mass during fermentation while circulating said mass within itself.

8. In the treatment of egg whites preparatory to drying, the step of fermenting upper and lower layers of an egg white mass within a container while propelling egg white material from one of said layers into the other of said layers, whereby to intercirculate upper and lower portions of said mass.

9. In the treatment of egg whites preparatory to drying, the step of fermenting an egg white mass within a container and having only its top surface in contact with air while propelling material within said mass in a downward direction so as to bring material from near the bottom of said mass to said top surface whereby top and bottom portions of said mass are circulated within said container.

NORMAN C. FISCHER.